United States Patent
Ko et al.

(10) Patent No.: US 7,379,402 B2
(45) Date of Patent: *May 27, 2008

(54) DISC WITH TEMPORARY DISC DEFINITION STRUCTURE (TDDS) AND TEMPORARY DEFECT LIST (TDFL), AND METHOD OF AND APPARATUS FOR MANAGING DEFECT IN THE SAME

(75) Inventors: Jung-wan Ko, Gyeonggi-do (KR); Kyung-geun Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 495 days.

This patent is subject to a terminal disclaimer.

(21) Appl. No.: 10/638,555

(22) Filed: Aug. 12, 2003

(65) Prior Publication Data

US 2004/0105363 A1 Jun. 3, 2004

(30) Foreign Application Priority Data

Aug. 12, 2002 (KR) ............... 10-2002-0047513
Aug. 12, 2002 (KR) ............... 10-2002-0047514

(51) Int. Cl.
*G11B 7/00* (2006.01)
(52) U.S. Cl. .................. 369/53.17; 369/53.16; 369/47.14
(58) Field of Classification Search ............ None
See application file for complete search history.

(56) References Cited

U.S. PATENT DOCUMENTS 4,835,757 A  5/1989  Abiko
5,025,431 A * 6/1991 Naito ............... 369/30.28
5,111,444 A * 5/1992 Fukushima et al. ...... 369/53.17
5,548,572 A  8/1996  Kulakowski et al.
6,189,118 B1  2/2001  Sasaki et al.
6,367,038 B1  4/2002  Ko (Continued)

FOREIGN PATENT DOCUMENTS

CN  1227950  9/1999

(Continued)

OTHER PUBLICATIONS

U.S. Appl. No. 10/638,481, filed Aug. 12, 2003, Ko et al, Samsung Electronics Co., Ltd.

(Continued)

*Primary Examiner*—William Korzuch
*Assistant Examiner*—Tawfik Goma
(74) *Attorney, Agent, or Firm*—Stein, McEwen & Bui, LLP

(57) ABSTRACT

A disc with a temporary defect management information area and a defect management area includes a defect management area that is present in at least one of a lead-in area, a lead-out area, and an outer area, a temporary defect information area which is formed in the data area and in which temporary defect information is recorded, and a temporary defect management information area which is present in at least one of the lead-in area, and the lead-out area. Accordingly, it is possible to record user data in a recordable disc, especially, a write-once disc, while performing defect management thereon, thereby enabling efficient use of a defect management area having a limited recording capacity.

2 Claims, 12 Drawing Sheets

U.S. PATENT DOCUMENTS

| | | | |
|---|---|---|---|
| 6,564,345 B1 * | 5/2003 | Kim et al. | 714/723 |
| 6,754,860 B2 * | 6/2004 | Kim et al. | 714/723 |
| 6,922,802 B2 * | 7/2005 | Kim et al. | 714/723 |
| 2004/0240341 A1 * | 12/2004 | Park | 369/47.14 |

FOREIGN PATENT DOCUMENTS

| | | |
|---|---|---|
| CN | 1323032 | 11/2001 |
| EP | 0 350 920 | 1/1990 |
| EP | 0 353 920 | 2/1990 |
| EP | 0 887 732 | 12/1998 |
| JP | 10/50005 | 2/1998 |
| WO | WO 01/75879 | 10/2001 |

OTHER PUBLICATIONS

U.S. Appl. No. 10/638,560, filed Aug. 12, 2003, Ko et al, Samsung Electronics Co., Ltd.

Office Action issued in Chinese Patent Application No. 038189933 on Dec. 7, 2007.

Preliminary Notice of First Office Action issued Jul. 2, 2007 by the Taiwan Intellectual Property Office re: Taiwanese Patent Application No. 92121766 (6 pp).

* cited by examiner

DISC WITH TEMPORARY DISC DEFINITION STRUCTURE (TDDS) AND TEMPORARY DEFECT LIST (TDFL), AND METHOD OF AND APPARATUS FOR MANAGING DEFECT IN THE SAME

CROSS-REFERENCE TO RELATED APPLICATIONS

This application claims the benefit of Korean Patent Application Nos. 2002-47513 and 2002-47514, both filed on Aug. 12, 2002 in the Korean Intellectual Property Office, the disclosures of which are incorporated herein in their entirety by reference.

BACKGROUND OF THE INVENTION

1. Field of the Invention

The present invention relates to disc defect management, and more particularly, to a disc in which a temporary defect management information area and a temporary management area are formed, and a method and apparatus for managing a defect in such a disc.

2. Description of the Related Art

Defect management is performed to allow a user to rewrite user data of a portion of a user data area in which a defect occurs in a new portion of the user data area of a disc, thereby compensating for a loss in data caused by the defect. In general, defect management is performed using linear replacement or slipping replacement methods. In the linear replacement method, a user data area in which a defect occurs is replaced with a spare data area having no defects. In the slipping replacement method, a user data area having a defect is slipped to use the next user data area having no defects.

Both linear replacement and slipping replacement methods are applicable only to discs such as a DVD-RAM/RW on which data can be repeatedly recorded and recording can be performed using a random access method. In other words, the conventional linear replacement and slipping replacement methods cannot be applied to write-once discs on which recording is allowed only once. In general, the presence of defects in a disc is checked by recording data on the disc and confirming whether the data can be recorded on the disc. However, once the data is recorded on a write-once disc, it is impossible to overwrite new data and manage defects therein.

Meanwhile, after the development of CD-R and DVD-R, a high-density write-once disc having a recording capacity of several dozen of GB has been introduced. This type of disc can be used as a backup disc since it is not expensive and allows random access, which enables fast reading operations. However, defect management is not available for write-once discs. Therefore, a backup operation is discontinued when a defective area (i.e., an area where a defect occurs) is detected during the backup operation because defect management on a write-once disc cannot be performed.

In general, the backup operation is performed when a system is not frequently used. Thus, backup operations are often performed at night when a system manager does not operate the system. In this case, it is more likely that the backup operation will be stopped because a defective area of a write-once disc is detected and the backup operation for the system will therefore not be performed in a reliable manner.

SUMMARY OF THE INVENTION

The present invention provides a write-once disc with a data structure which allows defect management, and a method of and apparatus for managing a defect in such a disc.

The present invention also provides a write-once disc with a data structure which allows defect management even if a defect occurs on the disc during recording operations, thereby rendering successful recording operations, and a method of and apparatus for managing a defect in a disc having the defect management.

Additional aspects and advantages of the invention will be set forth in part in the description which follows and, in part, will be obvious from the description, or may be learned by practice of the invention.

According to an aspect of the present invention, a disc includes a defect management area in at least one of a lead-in area, a lead-out area, and an outer area; a temporary defect information area in a data area and in which temporary defect information is recorded; and a temporary defect management information area in at least one of the lead-in area, and the lead-out area.

According to another aspect of the present invention, a method of managing a defect in a disc includes recording defect information regarding data recorded in a recording operation, and defect information regarding data recorded in a previous recording operation as first temporary defect information in a data area of the disc; and recording the first temporary defect information and defect information regarding data recorded in a next recording operation as second temporary defect information in the data area.

According to yet another aspect of the present invention, a method of managing a defect in a disc includes recording defect information regarding data recorded in a data area of the disc according to a first recording operation, defect information regarding data recorded in the data area according to a second recording operation, defect information regarding data recorded in the data area according to an $n-1^{st}$ recording operation, and defect information regarding data recorded in the data area according to an $n^{th}$ recording operation, as $n^{th}$ temporary defect information in the data area; and recording defect management information for managing the $n^{th}$ temporary defect information as $n^{th}$ temporary defect management information in a temporary defect management information area, where n is an integer.

It is preferable, but not required, that the method further includes recording a last recorded temporary defect information and temporary defect management information in a defect management area during finalization of the disc.

It is preferable, but not required, that the recording $n^{th}$ temporary defect information includes recording the data in a predetermined unit; verifying the recorded data to detect an area of the disc in which a defect exists; storing in a memory information for designating an area covering the area having the defect and data recorded after the area having the defect as a defective area; recording the data in a predetermined unit after the defective area; repeating verifying and storing at least once; and reading the information from the memory and recording the read information in an $n^{th}$ temporary defect information area of the data area when an $n^{th}$ recording operation is to end.

It is more preferable, but not required that the recording the $n^{th}$ temporary defect information further includes recording information for designating the $n^{th}$ temporary defect information area as a defective area in the $n^{th}$ temporary defect information area.

According to still another aspect of the present invention, a recording apparatus includes a recording unit that records data in a data area of a disc according to a recording operation; and a controller that controls the recording unit to record defect information regarding data, which is recorded in a data area according to a recording operation, as temporary defect information in the data area and record temporary defect management information for managing the temporary defect information in a temporary defect management information area in at least one of a lead-in area and a lead-out area of the disc.

According to still another aspect of the present invention, a recording apparatus includes a recording unit that records data on a disc; and a controller that controls the recording unit to record defect information regarding data recorded in a data area of the disc according to a first recording operation through an $n^{th}$ recording operation as $n^{th}$ temporary defect information in the data area; and controls the recording unit to record defect management information for managing the $n^{th}$ temporary defect information as $n^{th}$ temporary defect management information in a temporary defect management information area where n is an integer.

According to still another aspect of the present invention, a disc includes a defect management area in at least one of a lead-in area and a lead-out area; a temporary defect information area that is in a data area and in which temporary defect information is recorded; a temporary defect management information area that is in at least one of the lead-in area and the lead-out area and in which temporary defect management information for managing the temporary defect information is recorded; and a defect management area that is formed in at least one of the lead-in area and the lead-out area and in which are recorded temporary defect information last recorded in the temporary defect information area and temporary defect management information last recorded in the temporary defect management information area.

According to still another aspect of the present invention, a disc includes a defect management area in at least one of a lead-in area, a lead-out area, and an outer area; a temporary defect information area that is in a data area and in which temporary defect information is recorded; a temporary defect management information area that is in the lead-in area, the lead-out area, and an outer area and in which is recorded temporary defect management information; and a defect management area that is in the lead-in area, the lead-out area, and the outer area and in which temporary defect information last recorded in the temporary defect information area and temporary defect management information last recorded in the temporary defect management information area are recorded.

According to still another aspect of the present invention, a method of managing a defect in a disc includes recording defect information regarding data recorded in a data area for every recording operation as temporary defect information in the data area; recording defect management information for managing the temporary defect information as temporary defect management information in a temporary defect management information area in at least one of a lead-in area and a lead-out area; and recording the temporary defect information and the temporary defect management information in a defect management area formed in at least one of the lead-in area and the lead-out area, during finalization of the disc.

According to still another aspect of the present invention, a method of managing a defect in a disc includes recording as $n^{th}$ temporary defect information in the data area defect information regarding data recorded in a data area of the disc according to a first recording operation, defect information regarding data recorded in the data area according to a second recording operation, defect information regarding data recorded in the data area according to and n−$1^{st}$ recording operation, and defect information regarding data recorded in the data area according to an $n^{th}$ recording operation; recording defect management information for managing the $n^{th}$ temporary defect information as $n^{th}$ temporary defect management information in a temporary defect management information area, where n is an integer, and recording a last recorded temporary defect information and temporary defect management information in a defect management area during finalization of the disc.

According to still another aspect of the present invention, a recording apparatus includes a recording unit that records data in a data area of a disc according to a recording operation; and a controller that controls the recording unit to record defect information regarding the recorded data as temporary defect information in the data area; controls the recording unit to record defect management information for managing the temporary defect information as temporary defect management information in a temporary defect management information area that is in at least one of a lead-in area and a lead-out area of the disc; and controls the recording unit to record the temporary defect information and temporary defect management information in a defect management area that is formed in at least one of the lead-in area and the lead-out area.

According to still another aspect of the present invention, a recording apparatus includes a recording unit that records data in a data area of a disc according to first through $n^{th}$ recording operations; and a controller that controls the recording unit to record defect information regarding the data recorded according to the first recording through $n^{th}$ recording operations as $n^{th}$ temporary defect information in the data area; controls the recording unit to record defect management information for managing the $n^{th}$ temporary defect information as $n^{th}$ temporary defect management information in a temporary defect management information area; and controls the recording unit to record a last recorded temporary defect information and temporary defect management information in a defect management area, where n is an integer.

According to still another aspect of the present invention, a disc includes a defect management area in at least one of a lead-in area and a lead-out area; a temporary defect information area that is in a data area and in which temporary defect information is recorded; and a temporary defect management information area that is formed in at least one of the lead-in area and the lead-out area and in which temporary defect management information for managing the temporary defect information is recorded, and wherein the temporary defect information and the temporary defect management information are recorded again when a disc defect is detected using a verify-after-write method.

According to still another aspect of the present invention, a disc includes a defect management area in at least one of a lead-in area and a lead-out area; a temporary defect information area that is in a data area and in which is recorded temporary defect information; and a temporary defect management information area that is in at least one of the lead-in area, the lead-out area, and the outer area and in which is recorded temporary defect management information is recorded, where the last recorded temporary defect information that was last recorded in the temporary defect information area and the last recorded temporary defect management information that was last recorded in the temporary defect management information area are recorded in the defect management area during finalization of the disc, and the temporary defect information and the temporary defect management information are recorded again in the temporary defect information area and the temporary defect management information area, respectively, when a disc defect is detected using the verify-after-write method.

According to still another aspect of the present invention, a method of managing a defect in a disc includes recording as temporary defect information in a data area defect information regarding data recorded in the data area for every recording operation; recording defect management information for managing the temporary defect information in a temporary defect management information area in at least one of a lead-in area and a lead-out area; and performing a verify-after-write method on at least one of the temporary defect information and the temporary defect management information and recording the temporary defect information and the temporary defect management information again when a disc defect is detected.

It is preferable, but not required, that the method further includes recording the temporary defect information and the temporary defect management information in a defect management area in the lead-in area and the lead-out area.

According to still another aspect of the present invention, a method of managing a defect in a disc includes recording as $n^{th}$ temporary defect information in a data area defect information regarding data recorded in the data area of the disc according to a first recording operation, defect information regarding data recorded in the data area according to a second recording operation, defect information regarding data recorded in the data area according to an $n-1^{st}$ recording operation, and defect information regarding data recorded in the data area according to an $n^{th}$ recording operation; recording defect management information for managing the $n^{th}$ temporary defect information as $n^{th}$ temporary defect management information in a temporary defect management information area; and performing a verify-after-write method on at least one of the $n^{th}$ temporary defect information and the $n^{th}$ temporary defect management information and recording the $n^{th}$ temporary defect information and the $n^{th}$ temporary defect management information again when a disc defect is detected, where n is an integer.

It is preferable, but not required, that the method further includes recording a last recorded temporary defect information and temporary defect management information in a defect management area during finalization of the disc.

According to still another aspect of the present invention, a recording apparatus includes a recording/reading unit which records data on or reads data from a data area of a disc; and a controller which controls the recording/reading unit to record as temporary defect information in the data area defect information regarding the data recorded on the disc according to a recording operation and to record defect management information for managing the temporary defect information as temporary defect management information in a temporary defect management information area in at least one of a lead-in area and a lead-out area; performs a verify-after-write method on at least one of the temporary defect information and temporary defect management information; and controls the recording/reading unit to record the temporary defect information and temporary defect management information when a disc defect is detected.

According to still another aspect of the present invention, a recording apparatus includes a recording unit that records data on a data area of a disc; and a controller that controls the recording unit to record as $n^{th}$ temporary defect information in the data area defect information regarding the data recorded in the data area of the disc according to first through $n^{th}$ recording operations as $n^{th}$ temporary defect information in the data area; controls the recording unit to record defect management information for managing the $n^{th}$ temporary defect information as $n^{th}$ temporary defect management information in a temporary defect management information area; performs a verify-after-write method on at least one of the $n^{th}$ temporary defect information and the $n^{th}$ temporary defect management information; and controls the recording unit to record the $n^{th}$ temporary defect information and the $n^{th}$ temporary defect management information again when a disc defect is detected, where n is an integer.

BRIEF DESCRIPTION OF THE DRAWINGS

The above and/or other aspects and/or advantages of the present invention will become more apparent and more readily appreciated by describing in detail embodiments thereof with reference to the accompanying drawings in which.

DETAILED DESCRIPTION OF THE EMBODIMENTS

Figure 1:
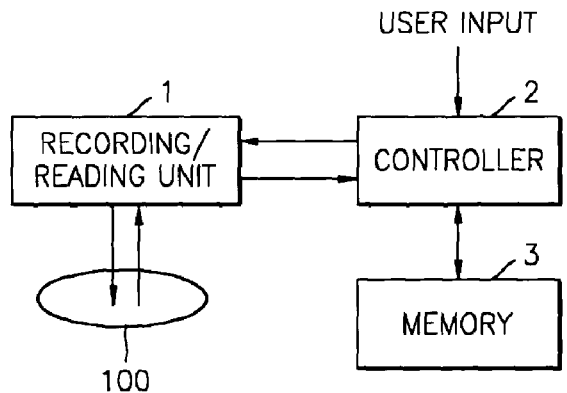
FIG. 1 is a block diagram of a recording and/or reproducing apparatus according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram of a recording and/or reproducing apparatus according to an embodiment of the present invention. Referring to FIG. 1, the recording apparatus includes a recording/reading unit 1, a controller 2, and a memory 3. The recording/reading unit 1 records and/or reproduces data with respect to a disc 100, which is an embodiment of an information storage medium. When recording the data, the recording/reading unit 1 reads the data from the disc 100 so as to verify the accuracy of the recorded data. The controller 2 performs defect management according to an embodiment of the present invention. According to an embodiment, the controller 2 uses a verify-after-write method in which the data is recorded on the disc 100 in predetermined units and a defect on the disc 100 is detected by verifying the accuracy of the recorded data.

After recording of the data in the predetermined units, the controller 2 records information which indicates the position of a defective area of the disc 100. The information is recorded as temporary defect information on the disc 100. Also, the controller 2 records on the disc 100 management information, which is information used to manage the temporary defect information. The management information is recorded as temporary defect management information. Here, the predetermined recording unit may be a recording operation that is a unit of work determined according to user's intention or a type of recording work to be performed. According to this embodiment, a recording operation indicates a process in which the disc 100 is loaded into the recording apparatus, data is recorded on the disc 100, and the disc 100 is taken out from the recording apparatus. However, it is understood that the recording operation can be otherwise defined. For instance, the recording operation can be defined according to a recording time or an amount of data that is recorded as opposed to or in addition to when a user inserts or removes a disc.

During the recording operation, data is recorded and verified at least once. According to an embodiment, when a user presses an eject button (not shown) of the recording apparatus in order to bring out the disc 100 after recording the data, the controller 2 expects the recording operation to be terminated. Next, the controller 2 creates the temporary defect information and temporary defect management information and provides the information to the recording/reading unit 1 to be recorded on the disc 100. The temporary defect information, which is obtained as a result of the recording and verifying by the controller 2, is stored in the memory 3. However, the verification can be performed at other times during recording.

If the recording of data on the disc 100 is completed (i.e., no more data will be recorded on the disc 100 and the disc 100 is finalized, the controller 2 records the temporary defect information and the temporary defect management information in a defect management area (DMA) of the disc 100.

Figure 2A:
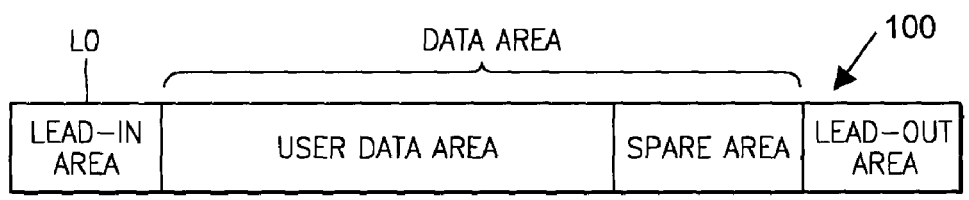
FIGS. 2A and 2B illustrate structures of discs according to embodiments of the present invention.
Figure 2B:
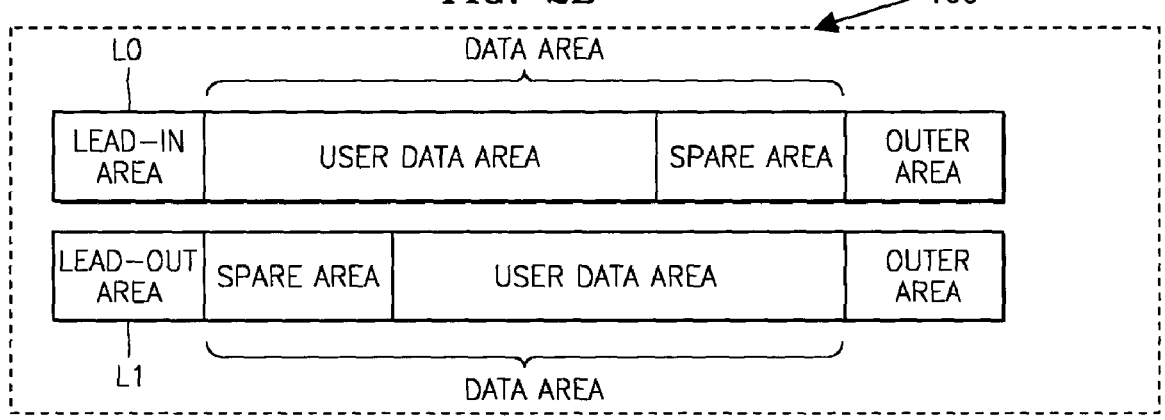

FIGS. 2A and 2B illustrate structures of the disc 100 according to embodiments of the present invention. In detail, FIG. 2A illustrates a disc 100 that is a single record layer disc having a record layer L0. The disc 100 includes a lead-in area, a data area, and a lead-out area. The lead-in area is located in an inner part of the disc 100 and the lead-out area is located in an outer part of the disc 100. The data area is present between the lead-in area and the lead-out area and is divided into a user data area and a spare area. The user data area is an area in which the user data is recorded. The spare area is a substitute area for a portion of the user data area having a defect in order to compensate for a loss in a recording area due to the defect.

It is preferable, but not required in all aspects, that the spare area includes 5% of the entire data capacity of the disc 100, so that a greater amount of data can be recorded on the disc 100 on the assumption that defects may occur therein. Also, it is preferable, but not required, that the spare area is present at an end of a recording area of the disc 100. Especially, in the case of a write-once disc 100, the spare area must be located at an end of a recording area of the disc 100 so that slipping replacement can be performed while the spare area data is recorded starting from an inner part of the disc 100 continuing toward the outer part.

In the shown embodiment, the spare area is present only between the user data area and the lead-out area. If necessary, a portion of the user data area may be used as another spare area. Specifically, according to another embodiment, more than one spare area may be formed between the user data area and the lead-out area.

FIG. 2B illustrates a disc 100 that has two record layers L0 and L1. A lead-in area, a data area, and an outer area are sequentially formed from an inner part of the first record layer L0 to its outer part. Also, an outer area, a data area, and a lead-out area are sequentially formed from an outer part of the second record layer L1 to its inner part. Unlike the single record layer disc 100 of FIG. 2A, the lead-out area of the second record layer L1 is present in the inner part of the second record layer L1 of the disc 100 of FIG. 2B. That is, the disc 100 of FIG. 2B has an opposite track path (OTP) in which data is recorded starting from the lead-in area at an inner part of the first record layer L0 toward the outer area and continuing from the outer area of the second record layer L1 to the lead-out area at the inner part.

Figure 3:
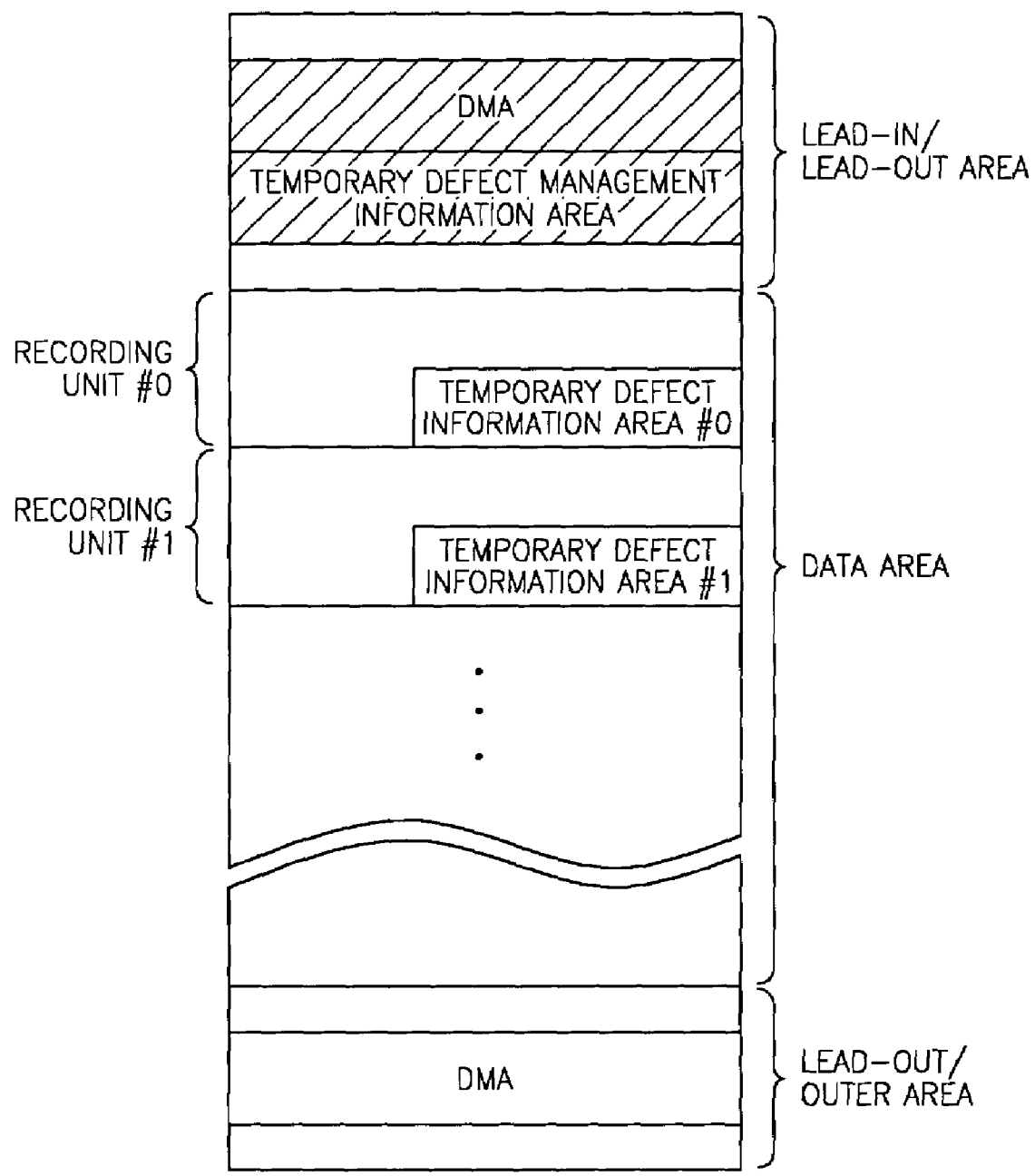
FIG. 3 illustrates an embodiment of a structure of the discs shown in FIGS. 2A and 2B.

FIG. 3 illustrates an example of the structure of the disc 100 embodiments shown in FIGS. 2A and 2B. Referring to FIG. 3, a DMA is present in at least one of the lead-in area, the lead-out area, and the outer area of the disc 100. Also, a temporary defect management area (TDMA) is formed in at least one of the lead-in area and the lead-out area. A temporary defect information area is formed in the data area in predetermined recording units.

In general, information which relates to managing defects on the disc 100 is recorded in the DMA. Such information includes a structure of the disc 100 for defect management, the position of the defect information, whether the defect management is performed, and the position and size of the spare area. For a write-once disc 100, new data is recorded after previously recorded data when the previously recorded data changes. In general, when the disc 100 is loaded into a recording/reproducing apparatus such as that shown in FIG. 1, the apparatus reads data from the lead-in area and the lead-out area of the disc 100 to determine how to manage the disc 100 and record or read data on or from the disc 100. However, if the amount of data recorded in the lead-in area increases, a longer time will be spent preparing the recording or reproducing of the data after loading the disc 100. Accordingly, an embodiment of the present invention proposes temporary defect management information and temporary defect information.

Specifically, only the temporary defect management information, which is comparatively more important than the temporary defect information, is recorded in the lead-in area. The temporary defect information is recorded in the data area. It is preferable, but not required, that new information is added to the previously recorded information in the temporary defect information so that all recorded information is accumulated therein. The recording/reproducing apparatus reads last recorded temporary defect information and detects defects throughout the disc 100 based on the read result. Thus, information regarding the location of the last recorded temporary defect information is recorded in temporary defect management information area, where the temporary defect management information is recorded.

More specifically, the information regarding a defect occurring in a recording unit #0 and information regarding a defect occurring in a recording unit #1 are recorded in the temporary defect management information area #0 and the temporary defect management information area #1, respectively. Defect management information for managing the temporary defect information areas #0, #1 is recorded in the temporary defect management information area. If no more data can be recorded on the disc 100 or if a user does not want to record more data on the disc 100 (i.e., the disc 100 needs to be finalized), the temporary defect information recorded in the temporary defect information area and the temporary defect management information recorded in the temporary defect management information area are recorded in the DMA.

The reason for recording the temporary defect management information and the temporary defect information in the DMA again will now be explained. When no more data will be recorded on the disc 100 (i.e., the disc 100 needs to be finalized), the temporary defect management information, which has been updated several times, and the temporary defect information recorded in the data area are moved to the DMA of the lead-in area. Thus, it is possible to have faster reading of information recorded on the disc 100. Also, it is possible to increase the reliability of the information by recording the defect management information in a plurality of areas.

In this embodiment, the defect information recorded in the temporary defect information areas #0 through #i−1 is again recorded in temporary defect information area #i. Therefore, it is sufficient to read the defect information from the last temporary defect information area and to again record the read information in the DMA during the finalization of the disc 100.

Figure 4:
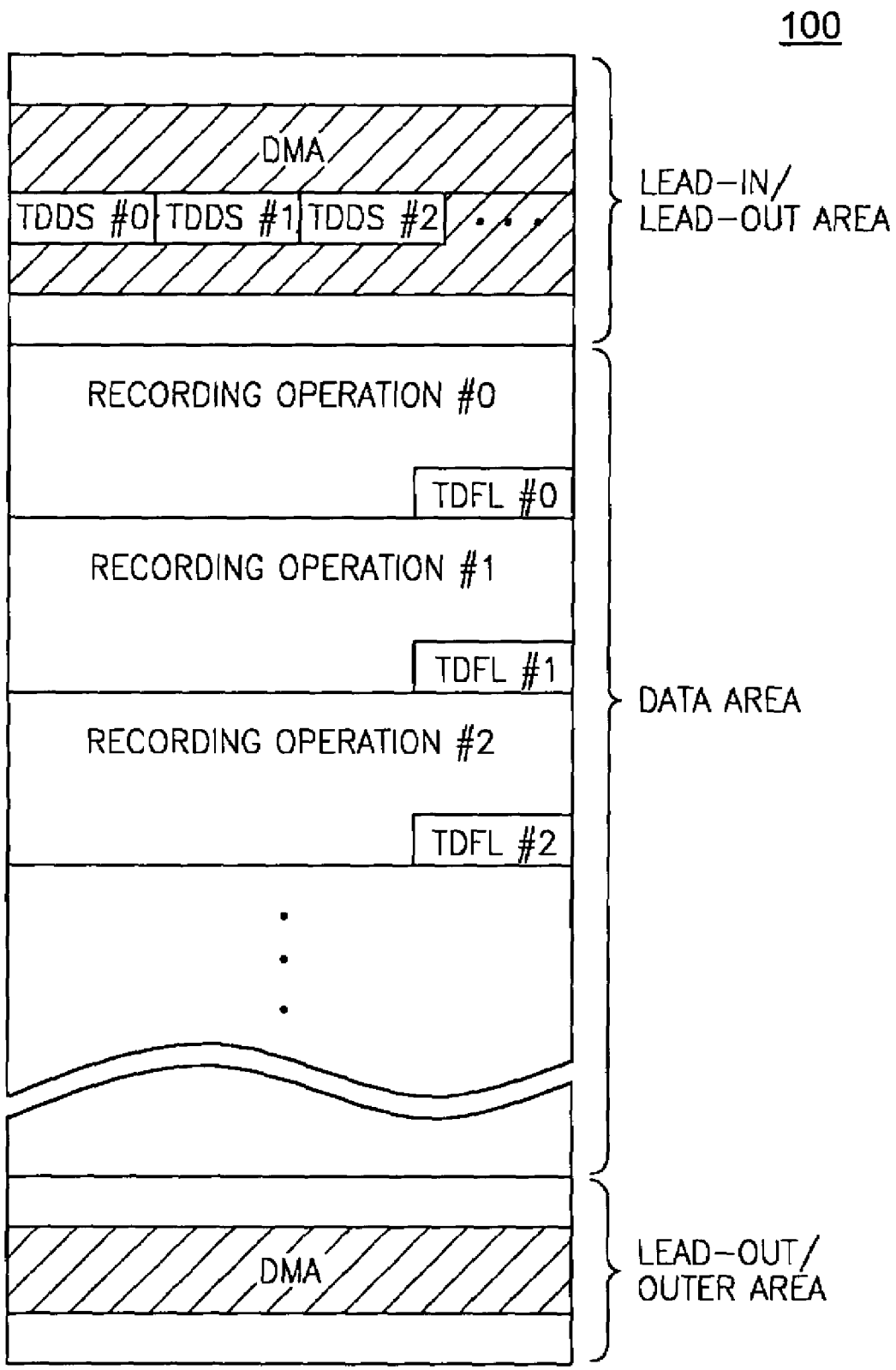
FIG. 4 illustrates an embodiment of the structure of the disc shown in FIG. 3.

FIG. 4 illustrates structures of the disc 100 shown in FIG. 3. Referring to FIG. 4, the DMA is formed in at least one of the lead-in area, the lead-out area, and the outer area of the disc 100. When the disc 100 is the single record layer disc 100 as shown in FIG. 2A, the DMA is formed in at least one of the lead-in area and the lead-out area. When the disc 100 is the double record layer disc 100 as shown in FIG. 2B, the DMA is formed in at least one of the lead-in area, the lead-out area, and the outer area of the disc 100. By way of example, if the disc 100 has a single record layer L0, DMAs are formed in both the lead-in area and the lead-out area, and if the disc 100 has two record layers L1, L0, DMAs are formed in the lead-in area, the lead-out area, and the outer area.

After recording the user data in the data area according to recording operation #0, a temporary defect list (TDFL) #0, which is a temporary defect information area corresponding to the recording operation #0, is disposed in the data area. Information regarding a defect occurring in the user data recorded according to the recording operation #0 is recorded in the TDFL #0. Similarly, the user data according to recording operation #1 is recorded in the data area, and a TDFL #1, which corresponds to the recording operation #1, is disposed in the data area. A TDFL #2, which corresponds to recording operation #2, is also disposed in the data area.

Temporary disc definition structure (TDDS), which is the temporary defect management information for managing the TDFLs #0 through #n, is recorded in the temporary defect management information area. The TDDSs #0 through #n correspond to the TDFL #0 through #n, respectively. Using the TDDSs #0 through #n, it is possible to record whether a defect is managed, the size of the spare area, and information for managing TDFL #i in TDDS #i. Also, it is possible to record information regarding the position of a defective area and the corresponding position of the spare area, which is a substitute for the defective area, in a TDFL #i.

For a high-density disc on which information of several dozen GB bytes can be recorded, it is desirable, but not required, that a cluster is allocated to each TDDS #i, and four to eight clusters are allocated to the TDFL #i. This allocation is because it is preferable to record new information in units of clusters in order to update information when a minimum physical unit of record is a cluster, although the amount of TDDS#i, which is temporary defect management information, is just several K bytes. Meanwhile, it is preferable, but not required, that a total amount of defects allowed in the disc 100 is about 5 percent of the disc recording capacity. For instance, the TDFL #i includes about four to eight clusters considering that information of about 8 bytes is required to record information regarding a defect and the size of a cluster is 64 Kbytes.

According to an aspect of the invention, the verify-after-write method can be performed in the TDDS #i and the TDFL #i. In this case, when a defect is detected, information is recorded again in the corresponding adjacent areas.

Figure 5:
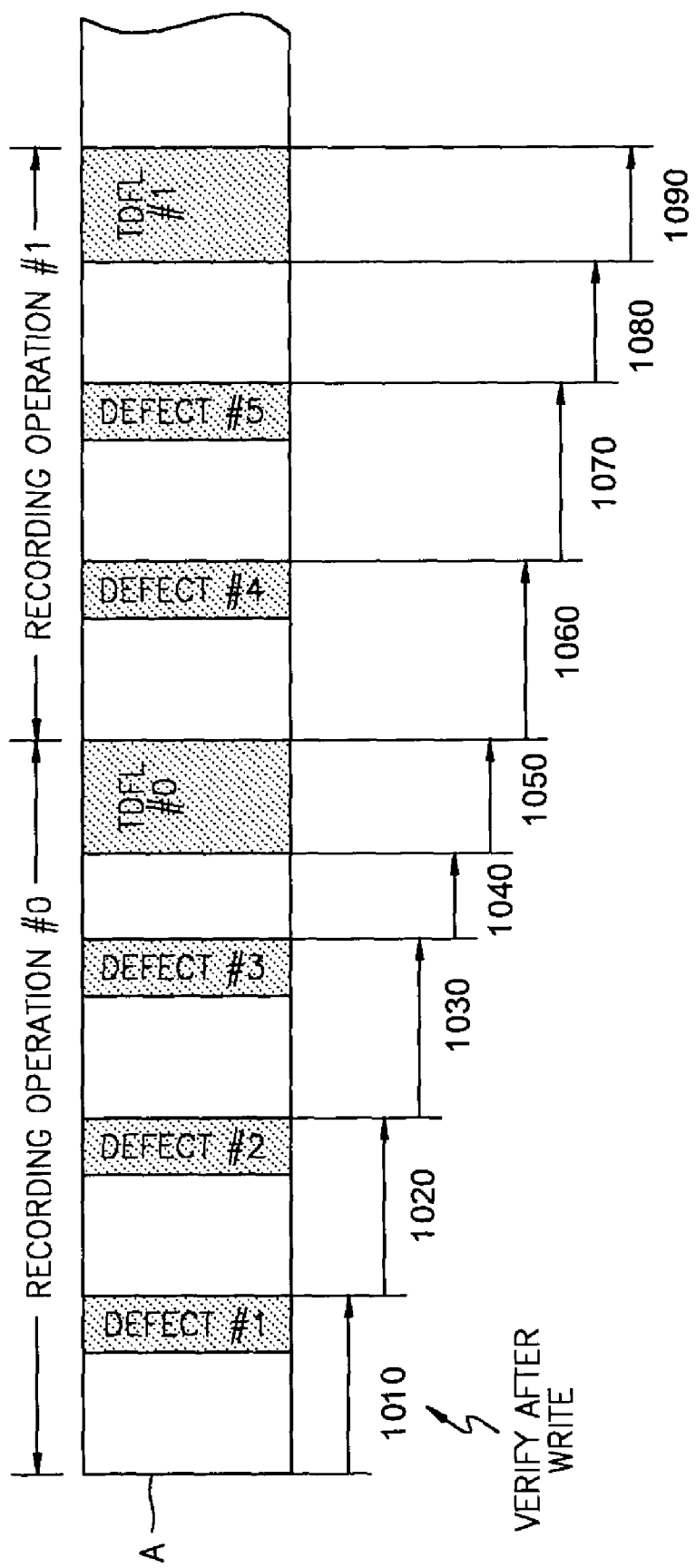
FIG. 5 is a diagram illustrating a process of recording a temporary defect list (TDFL) of the structure shown in FIG. 4 according to an embodiment of the present invention.

FIG. 5 is a diagram illustrating a process of recording a TDFL according to an embodiment of the present invention. Here, a unit of data may be processed in units of sectors or clusters. A sector denotes a minimum unit of data that is managed in a file system of a computer or an application, and a cluster denotes a minimum unit of data that can be physically recorded on a disc at once. In general, one or more sectors constitute a cluster.

There are two types of sectors: a physical sector and a logical sector. The physical sector is an area where a sector of data is to be recorded on the disc 100. An address for detecting the physical sector is called a physical sector number (PSN). The logical sector is a unit of sector for managing data in a file system or an application. An address for detecting the logical sector is called a logical sector number (LSN). A disc recording/reproducing apparatus such as that shown in FIG. 1 detects the position of the data to be recorded on the disc 100 using the PSN, and the whole part of data is managed in units of the LSNs in a computer or an application in order to record data on the disc 100. The relationship between the LSN and the PSN is changed by the controller 2 of the recording/reproducing apparatus, based on whether the disc contains a defect and an initial position of recording data.

Referring to FIG. 5, A denotes a data area in which the PSNs are allocated to a plurality of sectors (not shown) in ascending order. In general, each LSN corresponds to at least one of the PSNs, respectively. However, since the LSNs are allocated to sectors, except for a defective sector, in ascending order, the correspondence between the PSNs and the LSNs is not maintained when the disc 100 has a defective area, even if the size of a physical sector is the same as that of a logical sector.

Referring to FIG. 5, 1010 through 1090 denote units of data by which a verifying work is performed after a recording work. In detail, a recording apparatus records user data in section 1010, returns to the start of the section 1010, and starts checking if the user data is appropriately recorded or a defect occurs in the section 1010. If a defect is detected, an area covering the defect and data recorded after the defect in the section 1010 is designated as defect #1. Next, the recording apparatus records the user data in section 1020, returns to the start of the section 1020, and checks if the user data is appropriately recorded or a defect occurs in the start. If a defect is detected, an area covering the defect and data recorded after the defect in the section 1020 is designated as defect #2. Likewise, defect #3 is determined in section 1030. However, since a defect is not detected in section 1040, a defective area is not determined in section 1040.

Because the disc 100 according to an embodiment of the present invention is a write-once disc 100, it is desirable, but not required, that data recorded after an area having a defect is not used and an area covering data recorded after the defect is determined to be a defective area as well as the area covering the defect. Assuming that the LSN i is allocated to an area in which the data is recorded after an area having a defect in order to use the data, an area in which data is recorded after the area having the LSN i must be denoted as the LSN i−1 for data reproduction. However, if there is a section to which the LSNs are not allocated in ascending order, it is not easy to manage the logic sectors. Therefore, in this embodiment, all of data areas after a defective area are also regarded as being defective areas, thereby increasing the efficiency of managing the logic sectors.

TDFL #0 is recorded in section 1050 when the recording operation #0 is expected to end after the recording and verifying of the data in the section 1040 (i.e., when a user presses an eject button of a recording apparatus or recording of user data allocated in a recording operation is completed). The TDFL #0 contains information regarding the defects #1 through #3 occurring in the sections 1010 through 1040. Similarly, TDFL #1 is recorded in sector 1090 to correspond to recording operation #1 to contain information regarding defects #4 and #5 in sectors 1060 through 1080. The TDFL #0 also contains information regarding a part of an area in which a user data is recorded according to the recording operation #0, where the part having a defect and thus being designated as a defective area. Also, the TDFL #1 contains information regarding a part of an area in which the user data recorded according to the recording operation #1, where the part having a defect is designated as another defective area. While not required in all aspect, the TDFL #1 further contains the information recorded in the TDFL #0 according to an aspect of the invention.

Figure 6A:
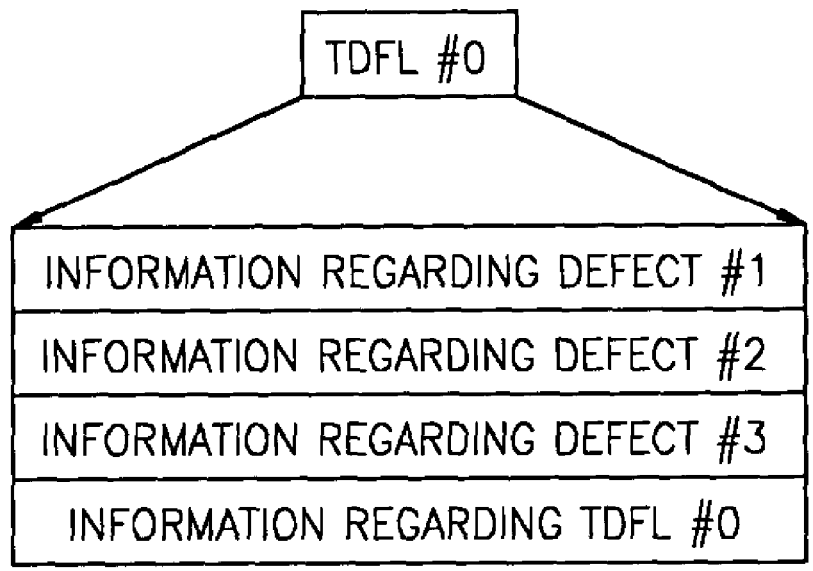
FIGS. 6A and 6B illustrate data structures of a TDFL according to an embodiment of the present invention.
Figure 6B:
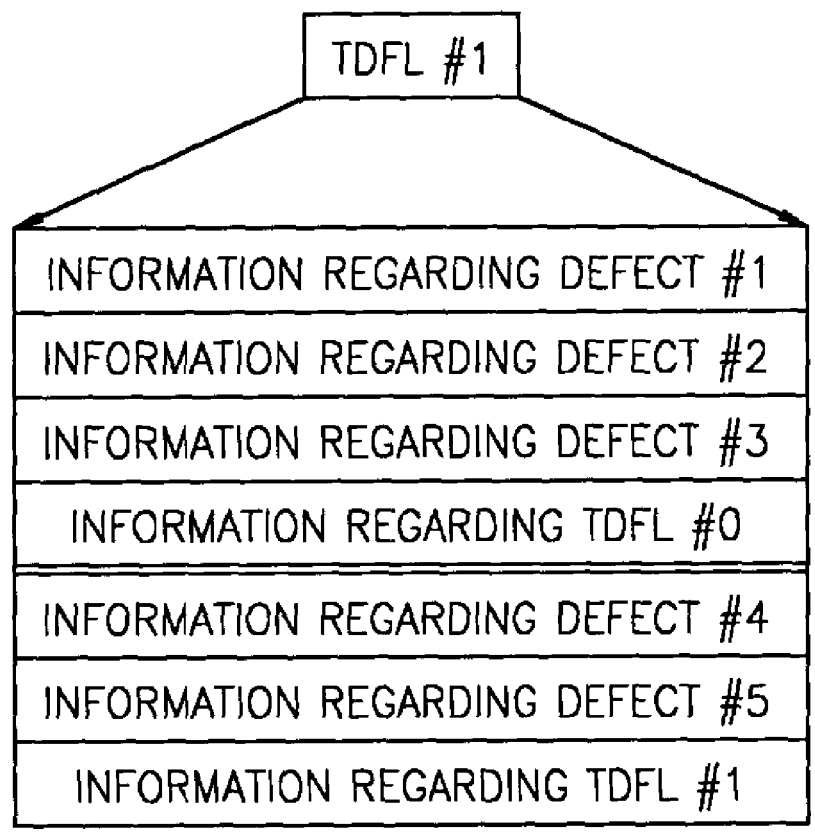

FIGS. 6A and 6B illustrate data structures of a TDFL according to an embodiment of the present invention. Referring to FIGS. 6A and 6B, information regarding defects #1 through #3 is recorded in TDFL #0. The information regarding the defect #1 describes the position of the defect #1, the information regarding the defect #2 describes the position of the defect #2, and the information regarding the defect #3 describes the position of the defect #3. Further, information regarding TDFL #0, which indicates the position of the TDFL #0, is further recorded in the TDFL #0.

Since the user data is not recorded in the TDFL #0, it is not required to read the information recorded in the TDFL #0 during reproduction of the user data. That is, for the reproduction of the user data, it is meaningless to distinguish between defective area #i and the TDFL #0 because the user data is not contained in these area. The TDFL #0 contains the information regarding its position and thus can be used as useful information, for example, to indicate during the reproduction of the user data that the user data is not recorded in the TDFL #0.

The TDFL #1 contains information regarding defects #4 and #5, in addition to the information recorded in the TDFL #0. The TDFL #1 also contains information regarding the position of the TDFL #1 for the same reason that the position is indicated in the TDFL #0.

Figure 7A:
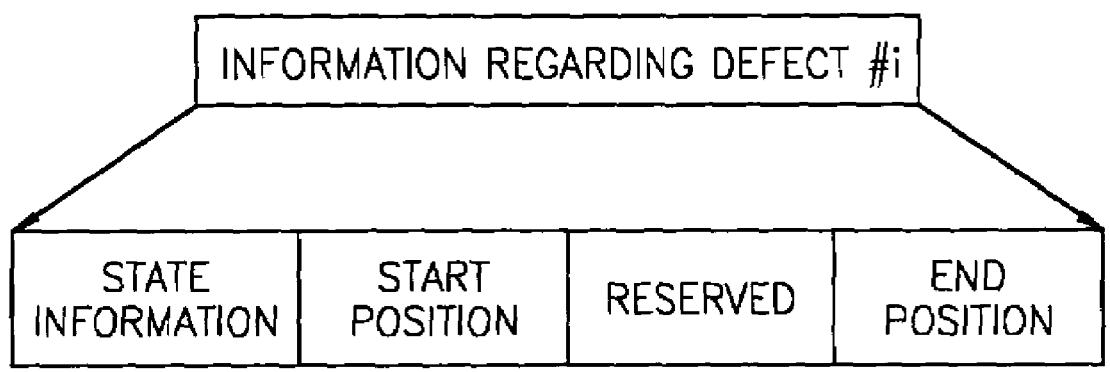
FIGS. 7A and 7B illustrate the data structure of defect #i contained in a TDFL and the data structure of the TDFL shown in FIG. 4 according to an embodiment of the present invention.
Figure 7B:
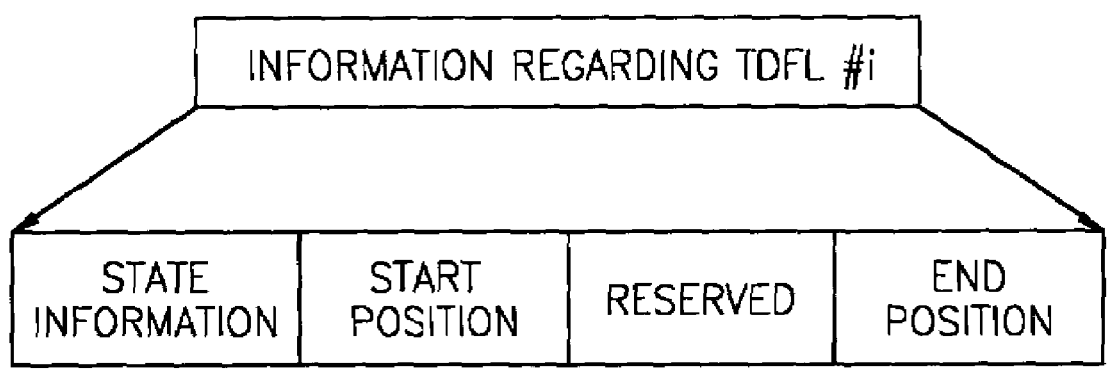

FIGS. 7A and 7B illustrate the data structures of information regarding defect #i contained a TDFL and information regarding TDFL #i. Referring to FIGS. 7A and 7B, the information regarding the defect #i includes information regarding the state, the start, reserved, and end positions of the defect #i. In general, the state information is flag information that indicates whether a present area is a defective area in which a defect occurs or is a TDFL in which is recorded temporary defect information. In the information regarding the defect #i, the state information is the flag information which indicates that the present area is a defective area. The start information represents the start of the present area (i.e., the start of the defect #i). The end information represents the end of the present area (i.e., the end of the defect #i). The reserved is referred to as an area in which recording is pending to record other information therein.

The information regarding the TDFL #i includes information regarding the state of and the start, reserved, and end positions of the TDFL #i. In general, the state information is flag information that indicates whether a present area is a defective area in which a defect occurs or is a TDFL in which is recorded temporary defect information. In the information regarding the TDFL #i, the state information is the flag information which indicates that the present area is a TDFL in which is recorded temporary defect information.

Figure 8:
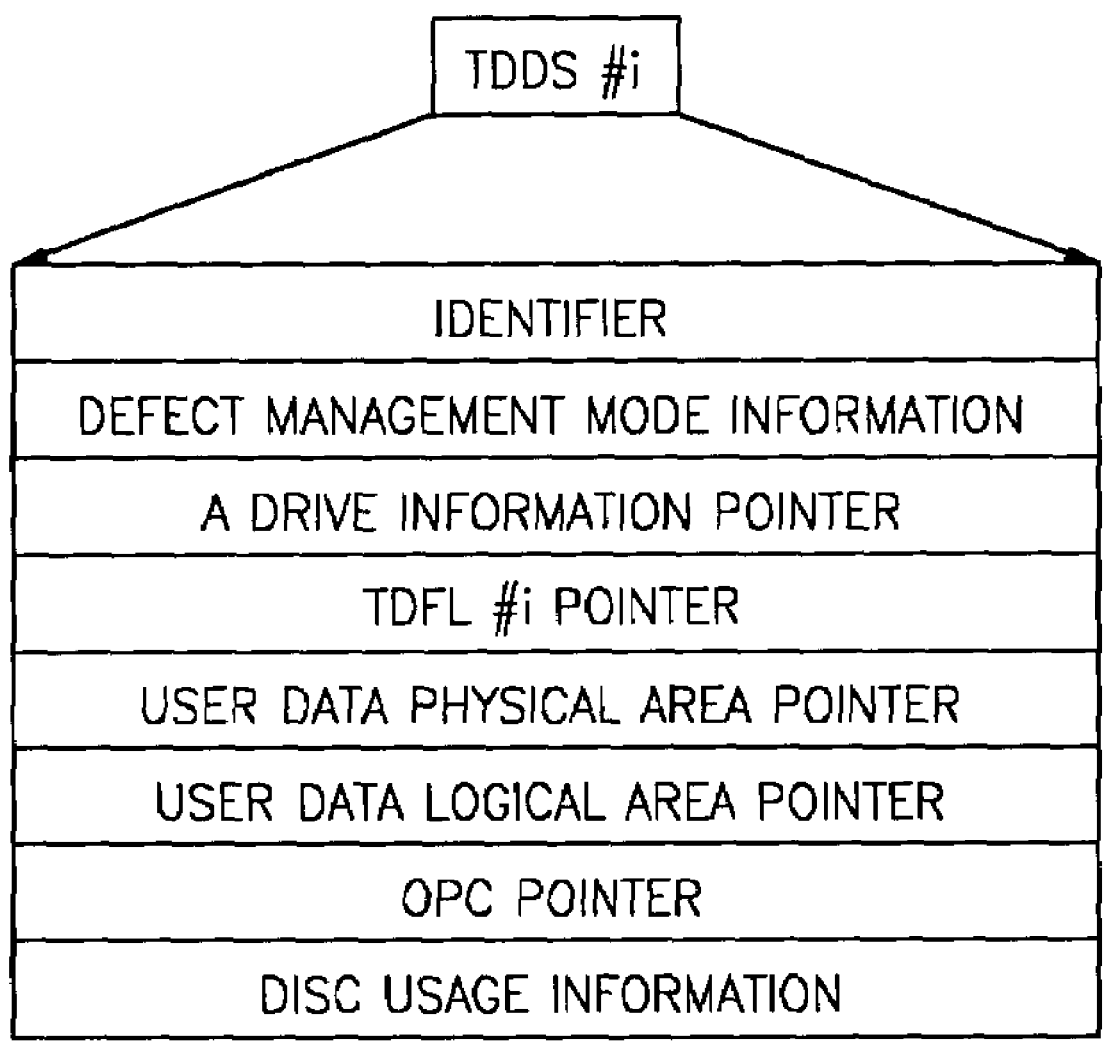
FIG. 8 illustrates the data structure of a temporary disc definition structure (TDDS) #i shown in FIG. 4.

FIG. 8 illustrates the data structure of temporary disc definition structure (TDDS) #i. Referring to FIG. 8, the TDDS #i includes an identifier, defect management mode information, a drive information pointer, a TDFL #i pointer, which points out the position of the corresponding TDFL #i, a user data physical area pointer, a user data logical area pointer, an optimal power control (OPC) pointer, and disc usage information.

The defect management mode information indicates whether defect management is performed on the disc 100. For instance, the information describes a spare area when defect management is performed and does not describe the spare area otherwise. If defect management is not required, the information provides this fact so that more user data can be recorded in the spare area, which otherwise uses about 5% of the disc recording capacity according to an aspect of the invention. The drive information pointer describes the location (e.g., the number of a first physical sector) of a drive information area (not shown) of the disc 100 according to an aspect of the present invention.

Drive information is obtained by conducting a test on the disc 100 with a certain disc drive, allowing the test to be skipped when data is read from the disc 100, thereby rendering fast reading operations. In other words, the drive information is created to use a certain drive without testing the drive. In this embodiment, the drive information includes recording conditions, such as an identifier of a used drive and the optimum record power. In the case of a write-once disc, data is recorded in a new cluster whenever drive information is updated. Thus, if information regarding an area of the disc 100 in which the next drive information is to be recorded is known in advance, it is possible to reduce time required to perform preliminary operations in order to read or reproduce data from or on the disc 100. For this reason, it is useful to record such drive information on a disc.

The TDFL #i pointer indicates the position of an area of the disc 100 where the TDFL #i is recorded (e.g., the number of a first physical sector of TDFL #i). The user data physical area pointer indicates the end (e.g., the number of the last physical sector) of a data area in which user data is physically recorded. The user data logical area pointer indicates the end part (e.g., the number of the last logical sector) of the data area in which user data is logically recorded. It is possible to detect the start of the data area where recording of the user data begins during a next recording operation, using the user data physical area pointer and the user data logical area pointer. The OPC pointer describes the location of a test area for detecting the optimum power control. The OPC pointer can also be used as information that provides a next area available when different types of drives are driven by different OPCs. The disc usage information specifies whether the disc 100 is finalized (i.e., whether user data can be further recorded in the data area).

Figure 9:
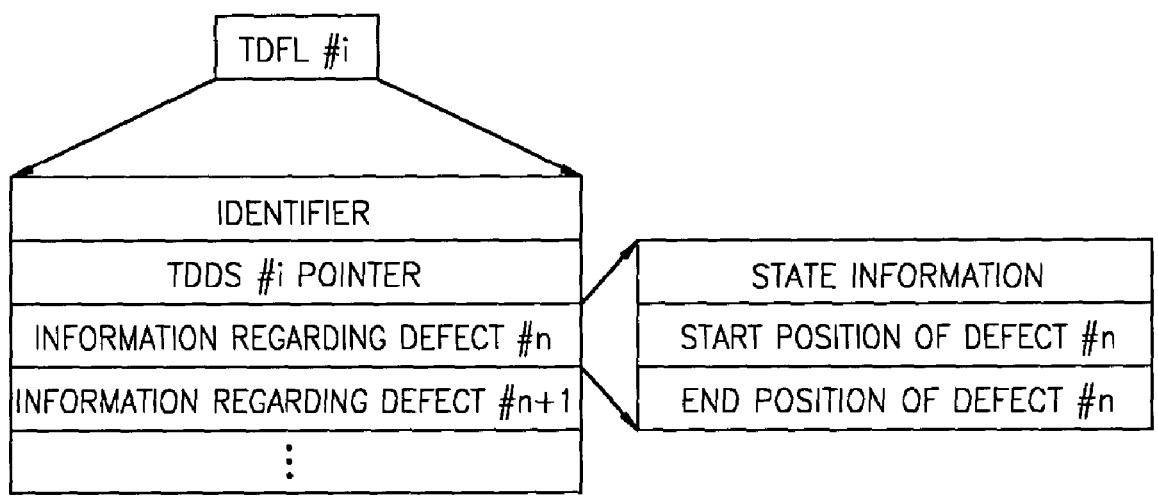
FIG. 9 illustrates the data structure of the TDFL #i shown in FIG. 8.

FIG. 9 illustrates an embodiment of the data structure of TDFL #i. Referring to FIG. 9, the TDFL #i includes an identifier, a TDDS #i pointer, information regarding defect #n, information regarding defect #n+1, and so on. The information regarding defect #n includes information regarding start and end positions of defect #n in state information.

The TDDS #i pointer indicates the position of an area in which is recorded a corresponding TDDS #i. For instance, the TDDS #i pointer can indicate the number of a first physical sector of the TDDS #i. Information regarding the position of the TDFL #i included in the TDDS #i and information regarding the position of the TDDS #i included in the TDDS #i specify the positions of the TDFL #i and the TDDS #i which are a pair of information. Thus, the above two different information can be used to verify the availability of information recorded in the TDFL #i and the TDDS #i.

The state information, which is the information regarding defect #n, describes whether a certain area is an actual defective area or an area where defect management information is recorded. The inclusion of the information regarding the defect #n into the state information is optional. The information regarding the start and end positions of the defect #n may be recorded with the number of a first physical sector and the number of the last physical sector of the defective area, respectively. The information regarding defect #n+1 is also recorded using the method of recording the information regarding the defect #n.

In an embodiment of the invention, the verify-after-write method is performed for every several clusters. If the verify-after-write method is performed for every single cluster, the size of an area, which is designated as a defective area, is determined to be a cluster, and thus, the number of the last physical sector of the area need not be recorded.

Figure 10:
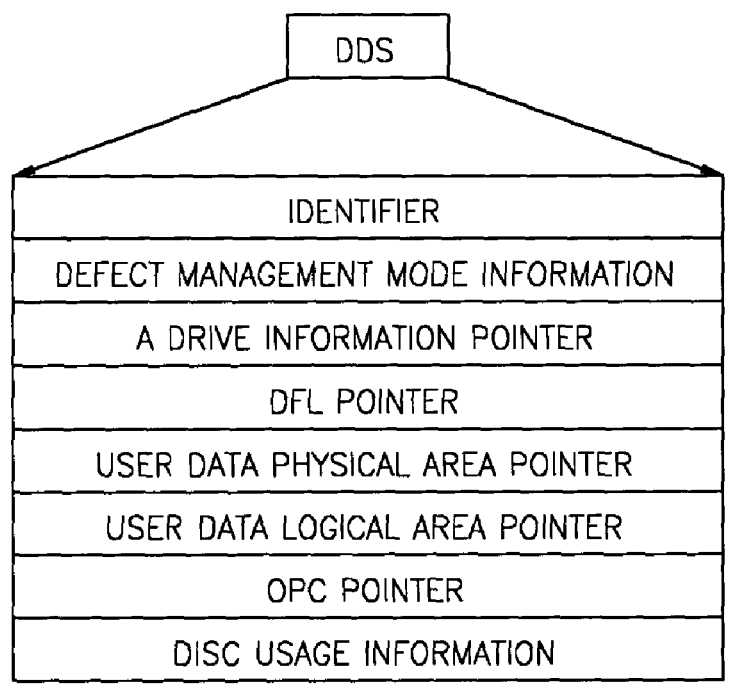
FIG. 10 illustrates a data structure of a disc definition structure (DDS) according to an embodiment of the invention for use in a disc shown in FIG. 3.

FIG. 10 illustrates the data structure of a disc definition structure (DDS) to be recorded in the DMA shown in FIGS. 3 and 4. Referring to FIG. 10, the DDS includes an identifier, defect management mode information, a drive information pointer, a DFL pointer which specifies the position of a corresponding DFL, a user data physical area pointer, a user data logical area pointer, an OPC pointer, and disc usage information.

The defect management mode information indicates whether defect management is performed. This information describes that a spare area is not formed in the disc 100 according to the present invention when the defect management is not performed, and describes that a spare area is formed otherwise. The drive information pointer specifies the position of a drive information area (not shown) of the disc 100. For example, the drive information pointer can specify the number of a first physical sector of the drive information area.

Drive information is obtained by conducting a test on the disc 100 with a certain drive, allowing the test to be skipped when data is read from the disc 100, thereby rendering fast reading operations. In other words, the drive information is created to use a certain drive without testing the drive. In this embodiment, the drive information includes recording conditions such as an identifier of a used drive and the optimum record power. In the case of a write-once disc, data is recorded in a new cluster whenever drive information is updated. Thus, if information regarding an area of the disc 100 in which the next drive information is to be recorded is known in advance, it is possible to reduce time required to perform preliminary operations in order to read or reproduce data from or on the disc 100. For this reason, it is useful to record such drive information on a disc.

The DFL pointer specifies the position of an area in which DFL is recorded (e.g., the number of a first physical sector of the DFL). The user data physical area pointer indicates the end position of an area of a data area in which user data is physically recorded (e.g., the number of the last physical sector of the area in which the user data is recorded). The user data logical area pointer indicates the end position of an area of a data area in which user data is physically recorded (e.g., the number of the last physical sector of the area in which the user data is recorded). With the user data physical area pointer and the user data logical area pointer, it is possible to know the start of an area in which user data is to be recorded during a next recording operation. The OPC pointer specifies the position of a test area for detecting the optimum power control. The OPC pointer can also be used as information that provides a next area available when different types of drives are driven by different OPCs. The disc usage information specifies whether the disc 100 is finalized (i.e., whether user data can be further recorded in the data area).

Figure 11:
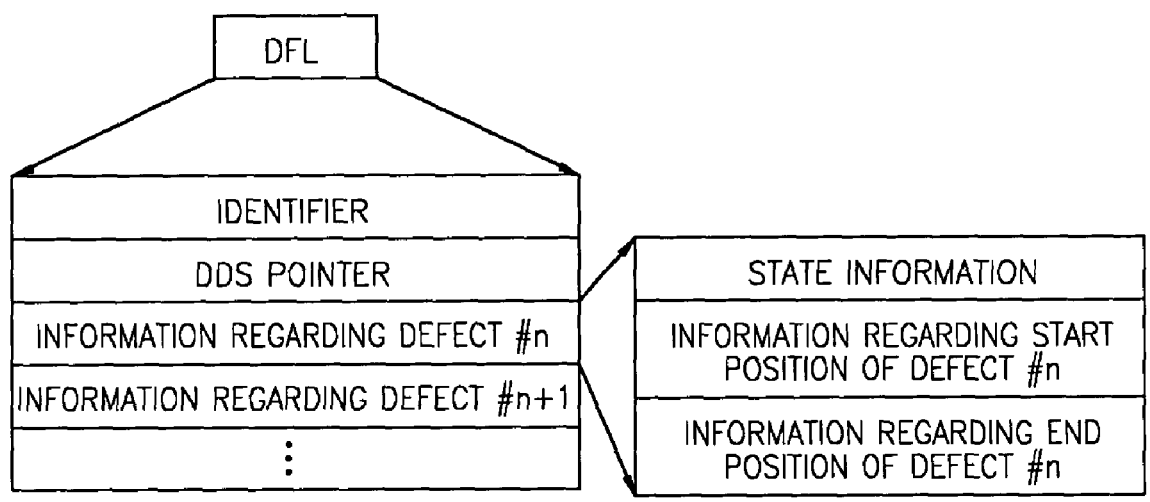
FIG. 11 illustrates a data structure of a defect list (DFL) according to an embodiment of the invention for use in a disc shown in FIG. 3.

FIG. 11 illustrates an embodiment of the data structure of a defect list (DFL) to be recorded in the DMA shown in FIGS. 3 and 4. Referring to FIG. 11, the DFL includes an identifier, a DDS pointer, information regarding defect #n, and information regarding defect #n+1. The information regarding defect #n includes information regarding the start and end positions of defect #n in state information. Here, information regarding defect #i may be information regarding the aforementioned TDFL #i.

The DDS pointer points out the position of an area in which a corresponding DDS is recorded (e.g., the number of a first physical sector of the DDS). Information regarding the position of the DFL included in the DDS and information regarding the position of the DDS included in the DFL, specify the positions of the DFL and the DDS which are a pair of information. Thus, the above two different information can be used to verify the availability of information recorded in the DFL and the DDS.

The state information, which is the information regarding defect #n, describes whether a certain area is an actual defective area or an area where defect management information is recorded. The inclusion of the information regarding the defect #n into the state information is optional. The information regarding the start and end positions of the defect #n may be recorded with the number of a first physical sector and the number of the last physical sector of the defective area, respectively. The information regarding defect #n+1 is also recorded using the method of recording the information regarding the defect #n.

In an embodiment of the invention, the verify-after-write method is performed for every several clusters. If the verify-after-write method is performed for every single cluster, the size of an area, which is designated as a defective area, is determined to be a cluster, and thus, the number of the last physical sector of the area need not be recorded.

Hereinafter, embodiments of a disc defect management method according to the present invention will be described.

Figure 12:
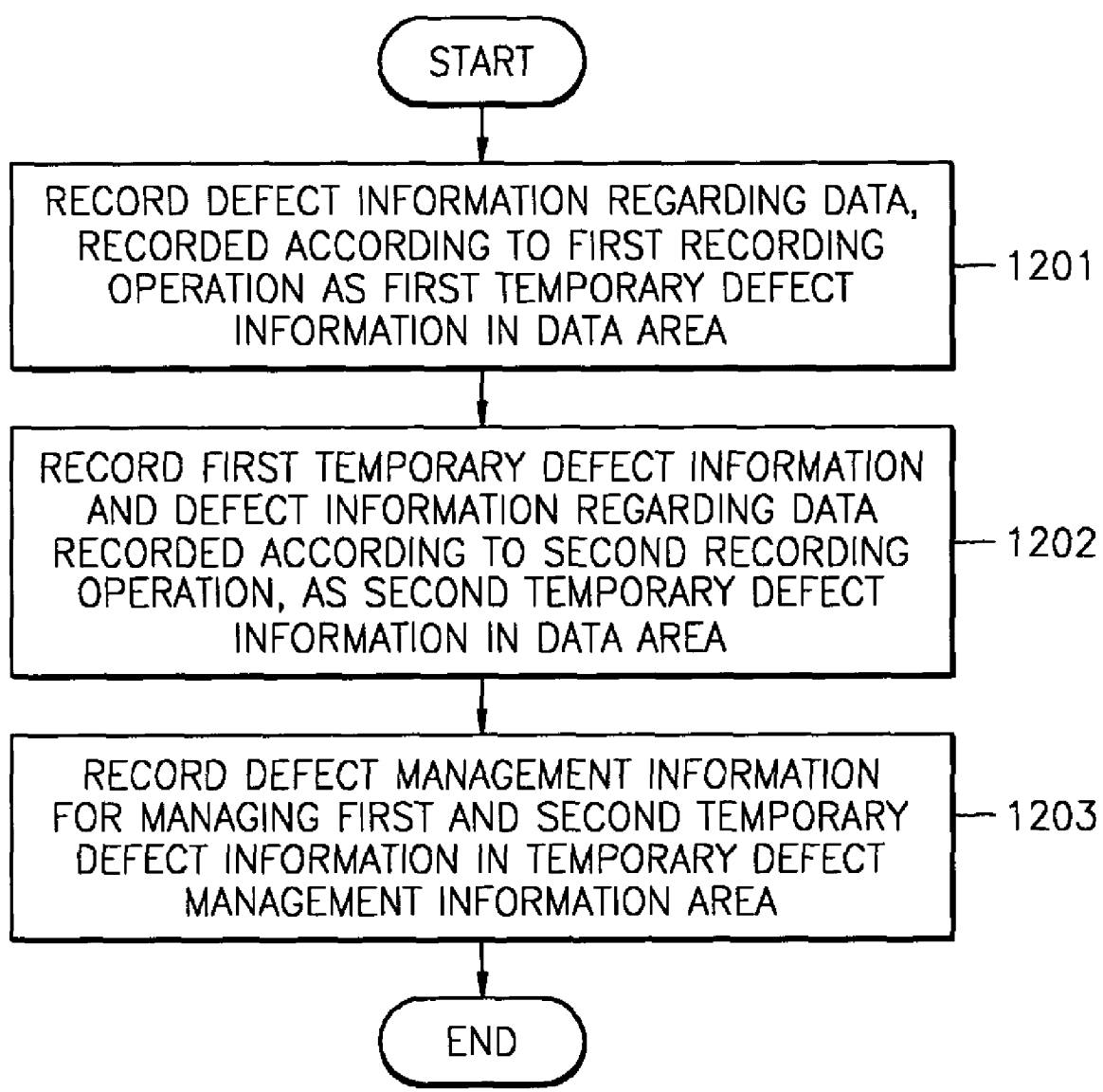
FIG. 12 is a flowchart illustrating a method of managing a defect in a disc according to an embodiment of the present invention.

FIG. 12 is a flowchart illustrating a disc defect management method according to an embodiment of the present invention. Referring to FIG. 12, in action 1201, a recording apparatus records defect information regarding data, which is recorded according to a first recording operation, as first temporary defect information in a data area of a disc, so as to perform disc defect management. In action 1202, the recording apparatus records the first temporary defect information and defect information regarding data, which is recorded according to a second recording operation, as second temporary defect information in the data area. In action 1203, the recording apparatus records defect management information for managing the first and second temporary defect information in a temporary defect management information area. In detail, action 1203 is performed by sequentially recording the first temporary defect information, the defect management information for managing the first temporary defect information, the first temporary defect management information, the second temporary defect information, the defect management information for managing the second temporary defect information, and the second temporary defect management information.

As described, the method only records two temporary defect information and two temporary defect management information for the sake convenience. However, it is understood there is no limit to the number of temporary defect information and defect management information which can be recorded. If the number is increased, temporary defect information is accumulatively recorded in the temporary defect management information area (i.e., all of previously recorded temporary defect information are recorded together with newly recorded temporary defect information).

During finalization of the disc, a last recorded temporary defect information and temporary defect management information may be either moved from the temporary defect management information area to a defect management area (DMA), or be maintained to be recorded in the temporary defect management information area. If the latter location is selected, a disc drive accesses the temporary defect management information area and reads the last recorded temporary defect information therefrom so as to detect a defective area of the disc.

Figure 13:
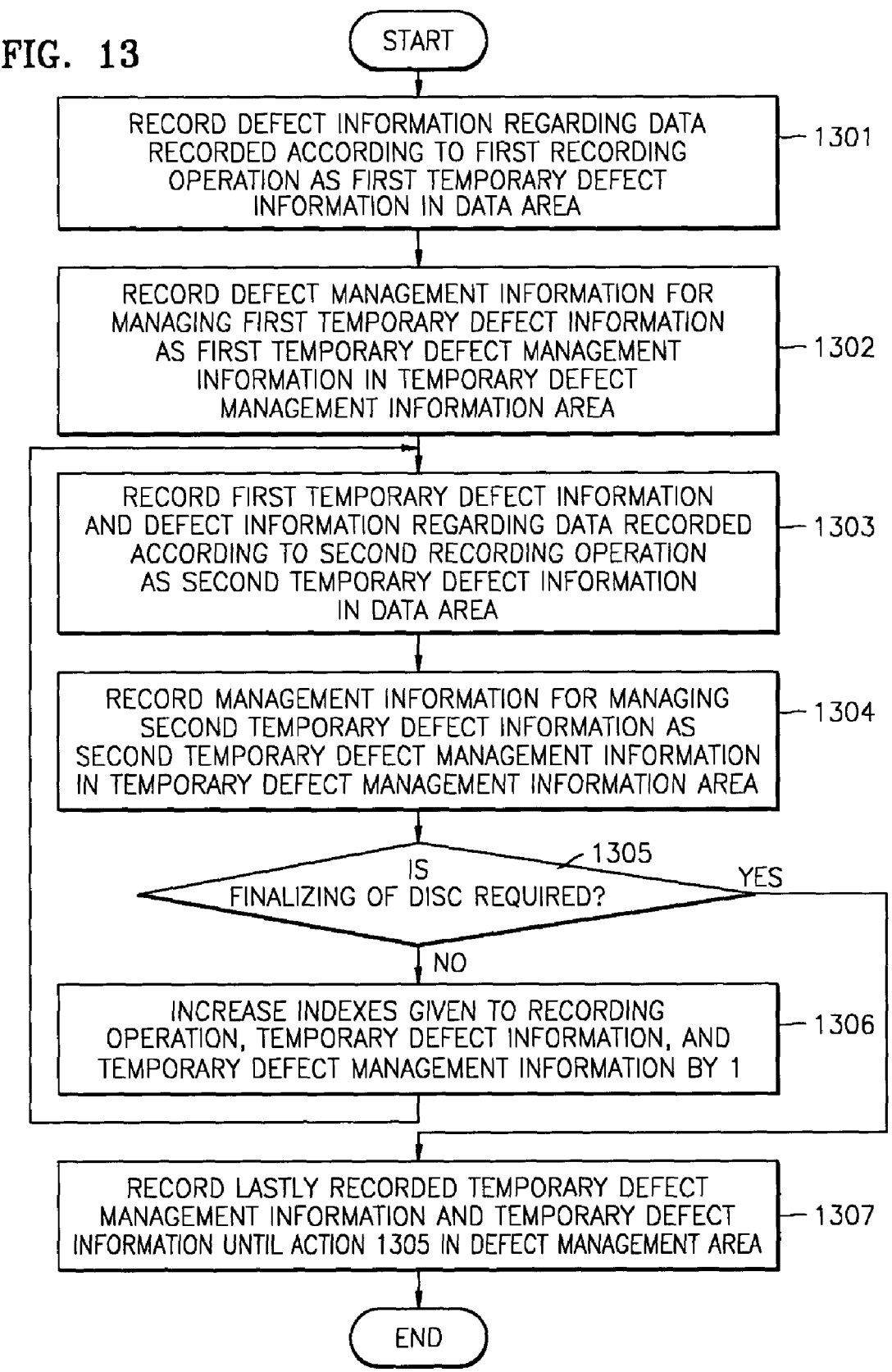
FIG. 13 is a flowchart illustrating a method of managing a defect in a disc according to another embodiment of the present invention.

FIG. 13 is a flowchart illustrating a disc defect management method according to another embodiment of the present invention. Referring to FIG. 13, in action 1301, a recording apparatus records defect information regarding data, which is recorded according to a first recording operation, as first temporary defect information in a data area of a disc, so as to perform disc defect management. In action 1302, the recording apparatus records defect management information for managing the first temporary defect information as first temporary defect management information in a temporary defect management information area which is present in at least one of a lead-in area and a lead-out area of the disc. In action 1303, the recording apparatus records the temporary defect information and defect information regarding data, which is recorded according to a second recording operation, as second temporary defect information in the data area. In action 1304, the recording apparatus records management information for managing the second temporary defect information as second temporary defect management information in the temporary defect management information area. In action 1305, it is checked whether finalization of the disc is required is checked.

In action 1306, if it is determined in action 1305 that finalization of the disc is not required, actions 1301 through 1304 are repeated while increasing indexes given to the recording operation, the temporary defect information, and the temporary defect management information by 1. It is understood that the indexing could be numbers other than 1 or non-integers so long as the index changes so as to reflect different recording operations being performed. While not required in all aspects, all of previously recorded temporary defect information are accumulatively recorded whenever new temporary defect information is recorded.

In action 1307, if it is determined in action 1305 that the disc is required to be finalized, a last recorded one of temporary defect management information and temporary defect information, which have been recorded until action 1305, are recorded in a defect management area (DMA). In other words, the last recorded temporary defect management information and temporary defect information are recorded as final defect management information and defect information in the DMA. The final defect management information and defect information may be repeatedly recorded to increase the reliability of data detection.

Figure 14:
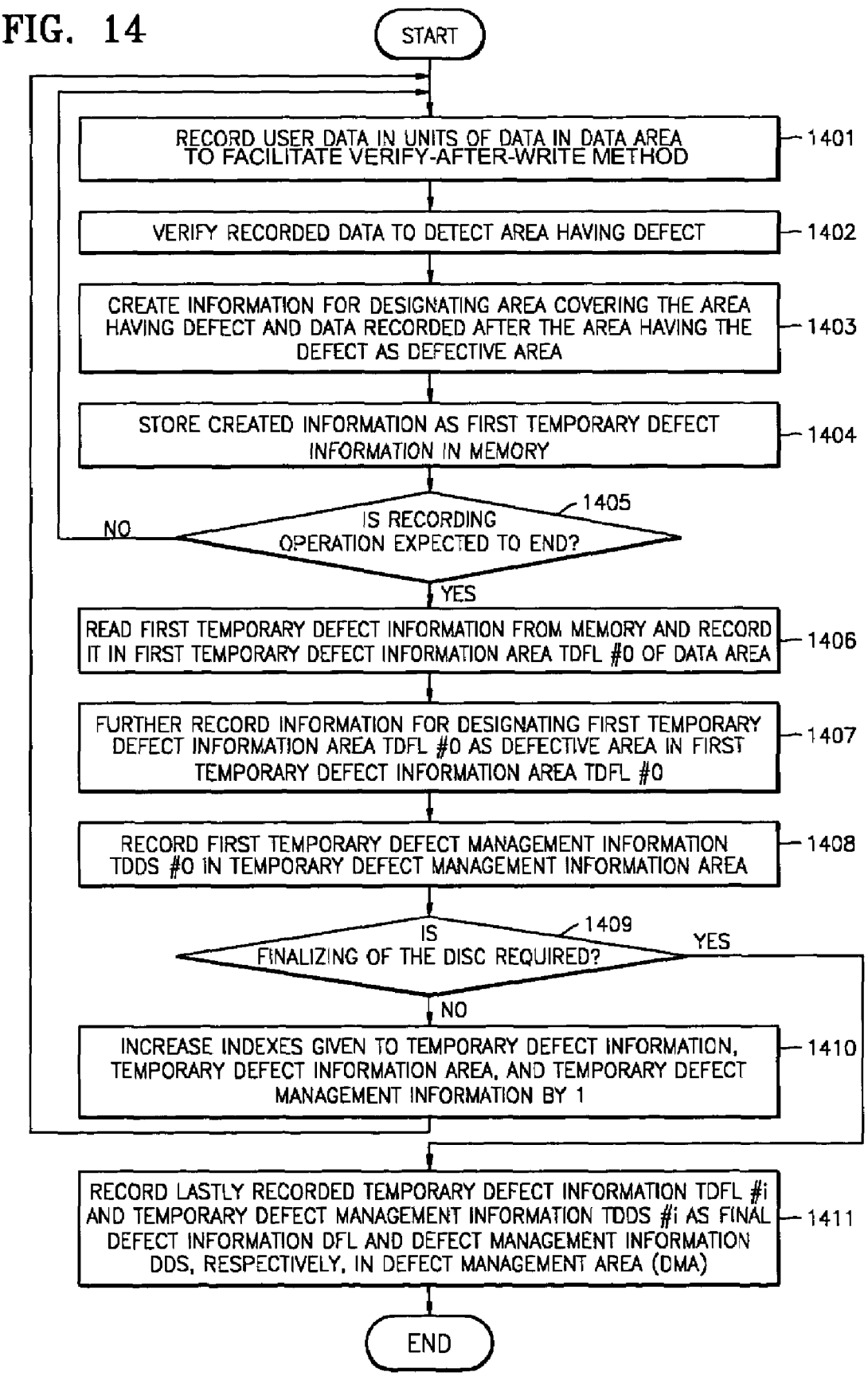
FIG. 14 is a flowchart illustrating a method of managing a defect in a disc according to yet another embodiment of the present invention.

Further, the verify-after-write method may be performed on the final defect management information and defect information according to an embodiment of the invention. If a defect is detected from these information, an area of the disc in which the defect occurs and data recorded after the area having the defect may be regarded as being unavailable (i.e., they are designated as a defective area), and the final defect management information and defect information may be again recorded after the defective area. FIG. 14 is a flowchart illustrating a method of managing a defect in a disc according to yet another embodiment of the present invention. Referring to FIG. 14, a recording apparatus records user data on a data area of a disc in units of data to facilitate the verify-after-write method, in action 1401. In action 1402, the data recorded in action 1401 is verified to detect an area of the disc in which a defect exists. In action 1403, the controller 2 of FIG. 1 creates information for designating an area covering the area having the defect and data recorded after the area having the defect, as a defective area. In action 1404, the controller 2 stores the created information as first temporary defect information in the memory 3 of FIG. 1. In action 1405, it is checked whether a recording operation is expected to end. If it is determined in action 1405 that the recording operation is not likely to end, actions 1401 through 1404 are repeated before the end of the recording operation.

In action 1406, if it is determined in action 1405 that the recording operation is likely to end (i.e., when the recording of the user data is complete by a user input or according to the recording operation), the controller 2 reads the first temporary defect information from the memory 3 and records the first temporary defect information in a first temporary defect information area TDFL #0 of the data area. In action 1407, information for designating the first temporary defect information area TDFL #0 as a defective area is further recorded in the first temporary defect information area TDFL #0. In action 1408, the controller 2 records management information for managing the first temporary defect information area TDFL #0 as first temporary defect management information TDDS #0 in a temporary defect management information area.

In action 1409, it is checked whether the disc is to be finalized. In action 1410, if it is determined in action 1409 that the disc is not required to be finalized, actions 1401 through 1408 are repeated before the finalization while increasing indexes given to the temporary defect information, the temporary defect information area, and the temporary defect management information by 1. Here, all of previously recorded temporary defect information are accumulatively recorded whenever new temporary defect information is recorded. It is understood that other numbers (including non-integers) could be used for the index so long as the index changes reflect different recording operations being performed.

In action 1411, if it is determined in action 1409 that finalization of the disc is required, a last recorded temporary defect information TDFL #i and temporary defect management information TDDS #i are recorded as final defect information DFL and defect management information DDS, respectively, in a defect management area (DMA). The final defect information (DFL) and defect management information (DDS) may be repeatedly recorded in the DMA several times so as to increase the reliability of data detection.

Further, the verify-after-write method may be performed on the final defect information (DFL) and final defect management information (DDS) according to an aspect of the invention. If a defect is detected from the DFL and DDS, an area covering an area of the disc in which the defect occurs and data recorded after the area having the defect, may be regarded as being unavailable (i.e., be designated as a defective area), and the DFL and DDS may be again recorded after the defective area.

The aforementioned defect management may be embodied as a computer program that can be run by a computer. Codes and code segments, which constitute the computer program, can be easily reasoned by a computer programmer in the art. The program is stored in a computer readable medium. When the program is read and run by a computer such as the controller 2 shown in FIG. 1, the defect management is performed. Here, the computer-readable medium may be on a magnetic recording medium, an optical recording medium, a carrier wave medium or any other medium from which a computer can recognize a program. Moreover, the computer can be a general or special purpose computer and can utilize the program encoded on firmware.

As described above, the present invention provides a defect management method that is applicable to a recordable disc, such as a write-once disc. In the method, a temporary defect information area is included in a data area of a disc, and therefore, defect information is accumulatively recorded in the temporary defect information area regardless of the disc recording capacity. Also, during finalization of the disc, only temporary defect information is read from the last temporary defect information area and the read information is recorded in a DMA, thereby enabling efficient use of the DMA whose recording capacity is limited. Accordingly, it is possible to record user data even on a write-once disc while performing defect management thereon, thereby backup operations can be more stably performed without interruptions.

In particular, a pointer, which specifies the position of a corresponding TDDS #i, is recorded in TDFL #i and a pointer, which specifies the position of TDFL #i, is recorded in the TDDS #i. Therefore, it is possible to crosscheck the relationship between the TDFL #i and the TDDS #i. For the same reason, it is possible to crosscheck the relationship between a DDS and a DFL. Further, defect management mode information is contained in the TDDS #i and the DDS and allows selective defect management, thereby successfully performing recording operations irrespective of recording environment conditions.

In addition, it is understood that, in order to achieve a recording capacity of several dozen gigabytes, the recording and/or reproducing unit 1 shown in FIG. 1 could include a low wavelength, high numerical aperture type unit usable to record dozens of gigabytes of data on the disc 100. Examples of such units include, but are not limited to, those units using light wavelengths of 405 nm and having numerical apertures of 0.85, those units compatible with Blu-ray discs, and/or those units compatible with Advanced Optical Discs (AOD).

While described in terms of a write-once disc, it is understood that the method can be used with rewritable media or where the medium has write-once and rewritable portions.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of managing a defect in a disc comprising a data area, the method comprising:
    recording, as first temporary defect information at a first location on the disc, defect information regarding data recorded in a current recording operation, and defect information regarding data recorded in a previous recording operation;
    recording, as second temporary defect information at a second location other than the first location on the disc, the first temporary defect information and defect information regarding data recorded in a next recording operation; and
    recording position information indicating a position of the temporary defect information comprised in temporary defect management information, in a defect management area during finalization of the disc.

2. A method of defect management for data recorded in an information storage medium, the method comprising;
    reproducing a defect list and a disc definition structure from a disc management area of the information storage medium, the defect list comprising position information regarding a defective cluster and the disc definition structure comprising position information regarding the defective list; and
    reproducing user data recorded in a data area of the information storage medium using the defect list,
    wherein the defect list is a copy of a last temporary defect list recorded in a first area of the information storage medium, the defect list being recorded when the information storage medium is finalized, and
    wherein the disc definition structure is a copy of a last temporary disc definition structure, which comprises position information regarding the last temporary defect list, recorded in a second area of the information storage medium, the disc definition structure being recorded when the information storage medium is finalized.

* * * * *